Apr. 10, 1923.

F. THORNTON, JR 1,451,556

ELECTRIC PERCOLATOR

Filed June 29, 1922

WITNESSES:
C. M. Cochran
H. M. Biebel

INVENTOR
Frank Thornton, Jr.
BY
Wesley G. Carr
ATTORNEY

Patented Apr. 10, 1923.

1,451,556

UNITED STATES PATENT OFFICE.

FRANK THORNTON, JR., OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC PERCOLATOR.

Application filed June 29, 1922. Serial No. 571,759.

*To all whom it may concern:*

Be it known that I, FRANK THORNTON, Jr., a citizen of the United States, and a resident of Wilkinsburg, in the county of Allegheny and State of Pennsylvania, have invented a new and useful Improvement in Electric Percolators, of which the following is a specification.

My invention relates to fluid heaters and, particularly, to electrically-heated percolators.

One object of my invention is to provide a relatively simple construction of vaporizing chamber for an electrically-heated percolator that shall have relatively few parts.

Another object of my invention is to provide a construction of vaporizing chamber for an electrically-heated percolator that shall be compact and have relatively short heat paths and that shall permit of easily and quickly removing and replacing the heating elements.

In the single sheet of drawings.

Figure 1:
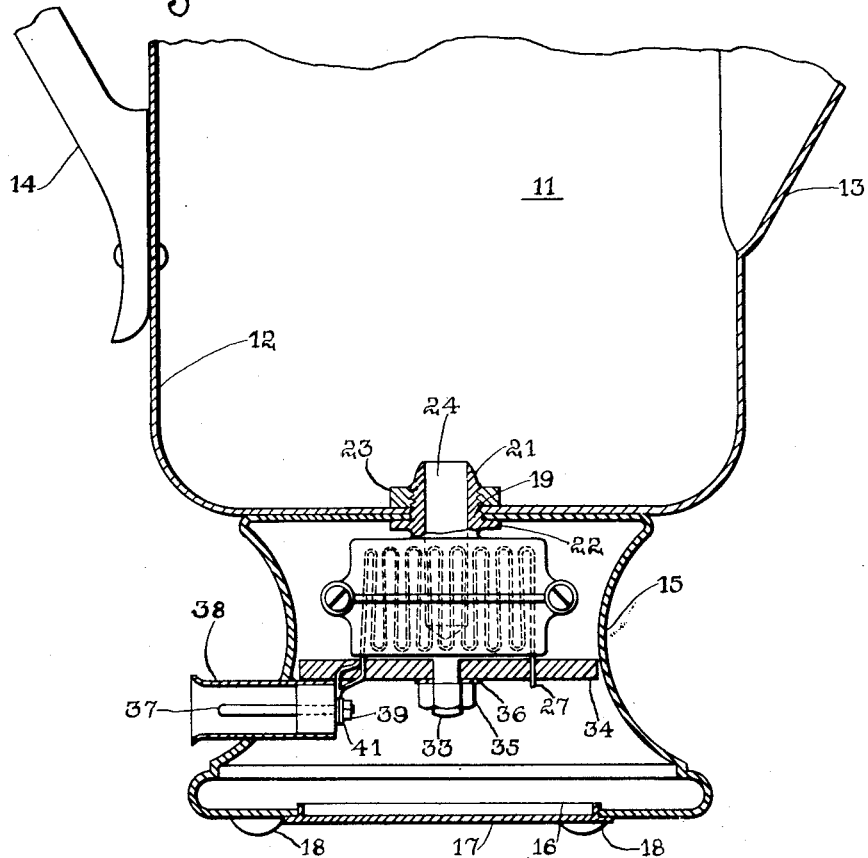
Figure 1 is a view, in vertical section, of a percolator comprising the device embodying my invention.
Figure 2:
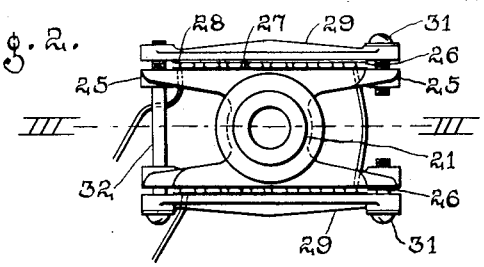
Fig. 2 is a top plan view of a device embodying my invention.
Figure 3:
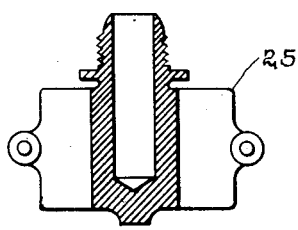
Fig. 3 is a longitudinal vertical sectional view thereof, taken on the line III—III of Fig. 2.

A percolator, designated generally by the numeral 11, comprises a fluid container 12 having a pouring spout 13, a handle 14 and a hollow supporting base 15. The base 15 is suitably secured, at its top, to the bottom of the container 12 and has an opening 16 in its base which is normally closed by a removable cover member 17. A plurality of supporting knobs 18 may be provided and secured against the bottom of the hollow base member 15 in any suitable or desired manner.

The bottom of the container 12 and the top portion of the base 15 are provided with registering openings 19, substantially at the center thereof, through which a member 21 extends into the container 12 to constitute a heating-element supporting member and a vaporizing chamber for the percolator. A laterally-extending circumferential flange 22 is provided intermediate the ends of the member 21 which operatively engages the bottom of the top portion of the base 15, and a nut 23 operatively engages the upper end of the member 21, being located within the container 12, to hold the member 21 in its proper operative position relatively to the base 15 and the container 12 and to provide a fluid-tight construction. An axial and longitudinally extending opening 24 is provided in the member 21 to constitute a vaporizing chamber for the percolator.

The member 21 is further provided with a plurality of pairs of laterally-extending flanges 25, located intermediate the ends thereof. The outer sides of the flanges 25 extend longitudinally of the member 21 and, in the position of the member 21 illustrated in the drawing, extend substantially vertically thereof. The outer faces of each pair of flanged members 25 are located in one plane to provide a surface which is parallel to the longitudinal axis of the member 21 in one direction and is tangential thereto in another direction. The thickness of the flange member 25 is increasead inwardly to provide an amount of material substantially in accordance with the amount of heat to be transmitted to the vaporizing chamber.

A heating element 26 operatively engages the outer surface of each pair of flanged members 25 and may be of any suitable or desired construction, here illustrated as comprising a resistor member 27 preformed to comprise a plurality of substantially parallel-extending convolutions. The resistor member 27 is located between two relatively thin sheets 28 of insulating material, such as mica.

While I have illustrated a particular heater, it is to be understood that this is for illustration only and any suitable or desired construction of heater having a relatively low heat-storage capacity may be employed. Clamping plates 29 are located on the outside of each of the heating elements 26 and may be held in place by screws 31 extending into and having screw-threaded engagement with the end portion of the flange members 25 or, if desired, a single long bolt 32 may be employed, extending through one of the clamping plates 29, two of the flanges 25 adjacent the ends thereof, and into the other clamping plate 29 having screw-threaded engagement therewith. Either of the above-described methods of securing the clamping plates in place may be employed, as the main consideration is to securely and tightly clamp the heating elements against the outer surfaces of each pair of flange members 25.

The member 21 is provided with a downwardly extending integral screw-threaded portion 33 upon which may be sleeved a heat-insulating disk 34 which is held in place by a nut 35 and a washer 36. The disk 34 is employed to reduce the amount of heat radiated downwardly from the heating elements, clamping plates and the lower surface of the member 22.

A plurality of terminal pins 37 are insulatedly mounted in a terminal guard or cage 38 which is located in, and secured to, a side wall of the hollow base member 15. The outer ends of the resistor member 27 may be electrically connected to the inner ends of the contact pins 37 by nuts 39 and washers 41. As two separate heating elements may be employed substantially as illustrated in the drawing, I prefer to bring out a loop to connect the inner ends of each of the resistor members 27, thus making it easily possible to connect in series-circuit relation to the resistor members 27 any type of circuit-interrupting device which it may be desired to include in the circuit in order to protect the apparatus against excess temperature of the heating element.

The device embodying my invention permits of designing the vaporizing chamber portion of the percolator to have only a relatively short heat path from the heating elements to the vaporizing chamber whereby I obtain a relatively quick action of the percolator. By reducing the amount of material, not only in the depending tubular member constituting the vaporizing chamber, but also in the heating elements themselves, the percolating action is initiated very quickly after the heating element of the percolator is energized.

Various modifications may be made in the system embodying my invention without departing from the spirit and scope thereof, and I desire that only such limitations shall be placed thereon as are imposed by the prior art or are specifically set forth in the appended claims.

I claim as my invention:—

1. In a percolator, in combination, a fluid container, a tubular member constituting a vaporizing chamber secured to the bottom of said container and depending therefrom and having a plurality of integral laterally extending flanges having sides substantially parallel to the longitudinal axis of the tubular member, heating elements engaging the outer sides of said flanges and means for clamping said heating elements against said flanges.

2. In a percolator, in combination, a fluid container having an opening in the bottom thereof, a tubular member constituting a vaporizing chamber extending into said container through said opening, means for securing it in said opening, a plurality of laterally extending flange members integral with said tubular member and having sides substantially parallel to the longitudinal axis of the tubular member, electric-heating elements operatively engaging the outer sides of said flange members, and removable plates for clamping the heating elements against the sides of said flange members.

3. In a percolator, in combination, a fluid container having an opening in the bottom thereof, a tubular member constituting a vaporizing chamber, located beneath and extending into, said container through said opening, means for securing the tubular member in proper operative position in said opening, a pair of laterally-extending flange members integral with said tubular member, the outer surfaces thereof lying in a single plane substantially parallel to the longitudinal axis of the tubular member, an electrical heating element operatively engaging the outer surface of said flange members, and means for clamping said heating element against said surfaces.

4. In a percolator, in combination, a fluid container having an opening in the bottom thereof, a tubular member constituting a vaporizing chamber, located beneath and extending into, said container through said opening, means in said container for securing said tubular member in proper operative position in said opening, a plurality of pairs of laterally-extending flange members integral with said tubular member, the outer surfaces thereof lying in a single plane substantially parallel to the longitudinal axis of the tubular member and the circumferential thickness thereof decreasing outwardly, electrical heating elements operatively engaging the outer surface of each pair of flange members, and means for clamping said heating elements in proper operative position against said surfaces.

5. In a percolator, in combination, a fluid container, a tubular member constituting a vaporizing chamber secured to the bottom of and extending into said container, a plurality of laterally-extending flange members having sides extending substantially parallel to the longitudinal axis of said tubular member, the circumferential thickness of the flange members being in accordance with the amount of heat flowing therethrough to said vaporizing chamber, electrical heating elements operatively engaging the outer sides of said flange members, and means for clamping said heating elements against said flange members.

In testimony whereof, I have hereunto subscribed my name this 23rd day of June 1922.

FRANK THORNTON, Jr.